US012553203B2

United States Patent
Kwok et al.

(10) Patent No.: US 12,553,203 B2
(45) Date of Patent: Feb. 17, 2026

(54) APPARATUS FOR AUTOMATICALLY EXTRUDING AND FORMING A FINISHED CONCRETE CHANNEL

(71) Applicant: Nano and Advanced Materials Institute Limited, Hong Kong (HK)

(72) Inventors: Chi Kwan Adye Kwok, Hong Kong (HK); Lai Ming Leung, Hong Kong (HK); Xianrui Chen, Hong Kong (HK); Zhihua Xiao, Hong Kong (HK)

(73) Assignee: Nano and Advanced Materials Institute Limited, Hong Kong (HK)

( * ) Notice: Subject to any disclaimer, the term of this patent is extended or adjusted under 35 U.S.C. 154(b) by 131 days.

(21) Appl. No.: 18/304,379

(22) Filed: Apr. 21, 2023

(65) Prior Publication Data

US 2024/0352698 A1 Oct. 24, 2024

(51) Int. Cl.
*E02B 11/02* (2006.01)
*B28B 3/20* (2006.01)

(52) U.S. Cl.
CPC .............. *E02B 11/02* (2013.01); *B28B 3/205* (2013.01)

(58) Field of Classification Search
CPC .......... E02B 11/02; E02B 5/02; E02B 11/005; B28B 3/205; E01C 19/4886
See application file for complete search history.

(56) References Cited

U.S. PATENT DOCUMENTS 856,383 A * 6/1907 Armbruster ............. B28B 7/183 249/169

FOREIGN PATENT DOCUMENTS

| | | | | | |
|---|---|---|---|---|---|
| CN | 100395413 | C | * | 6/2008 | |
| CN | 101787670 | B | * | 6/2012 | |
| CN | 206143569 | U | * | 5/2017 | |
| CN | 107326871 | A | * | 11/2017 | ............... E02B 5/02 |
| CN | 108372576 | A | * | 8/2018 | ........... B28B 13/065 |
| CN | 109113276 | A | * | 1/2019 | ........... E04D 13/064 |
| CN | 210460686 | U | * | 5/2020 | |
| CN | 111792542 | A | * | 10/2020 | |
| CN | 109113276 | B | | 7/2021 | |
| KR | 100756387 | B1 | * | 9/2007 | |

(Continued)

OTHER PUBLICATIONS

Machine translation of CN100395413C (Year: 2008).*

(Continued)

*Primary Examiner* — Ariella Machness
(74) *Attorney, Agent, or Firm* — IDEA Intellectual Limited; Sam T. Yip

(57) ABSTRACT

An apparatus for automatically extruding and forming a finished concrete channel in a drainage ditch. The apparatus includes a frame having support rails for positioning the apparatus over a drainage ditch. A concrete-receiving hopper is attached to the frame for delivering received concrete into the ditch to be shaped into a channel form. A mold having a projection to define a concrete surface of the channel is positioned beneath a top portion of the frame and configured to be received in a hollow mating portion of a laterally-reciprocating piston to shape the received concrete. A lever driver drives the reciprocating piston through a mechanically-linked motor. A vibrator cooperates with the concrete-receiving hopper to urge received concrete into the ditch to be shaped by the mold.

6 Claims, 11 Drawing Sheets

(56) References Cited

FOREIGN PATENT DOCUMENTS

| | | | | | |
|---|---|---|---|---|---|
| KR | 20090082324 | A | * | 7/2009 | |
| WO | WO-2013127351 | A1 | * | 9/2013 | ............... E02B 5/02 |

OTHER PUBLICATIONS

Machine translation of CN101787670B (Year: 2012).*
Machine translation of CN107326871A (Year: 2017).*
Machine translation of KR20090082324A (Year: 2009).*
Machine translation of CN111792542A (Year: 2020).*
Machine translation of KR100756387B1 (Year: 2007).*
Machine translation of CN108372576A (Year: 2018).*
Machine translation of WO2013127351A1 (Year: 2013).*
Machine Translation of CN210460686U (Year: 2020).*
Machine Translation for CN206143569U (Year: 2017).*

* cited by examiner

APPARATUS FOR AUTOMATICALLY EXTRUDING AND FORMING A FINISHED CONCRETE CHANNEL

FIELD OF THE INVENTION

The present invention generally relates to a construction apparatus, in general and, more particularly, to an apparatus for automatically extruding and forming a finished concrete channel.

BACKGROUND OF THE INVENTION

Drainage ditches and gutters are used alongside many roadways and paved surfaces to control soil erosion by rain water as well as for directing storm water runoff away from the pavement. The ditches are generally concave and several feet deep and wide and lined with concrete or other durable materials. The conventional way to lay ditches is to excavate the ditch followed by manually forming the concrete channel using a mold/concrete form of wood or other similar material, pour the concrete into the mold, and screed and finish the surface of the ditch by concrete workers, which is time consuming, costly, and inefficient. It is extremely labor-intensive and can result in rapid worker burnout, especially when working under adverse weather conditions. A shortage of skilled labor is a major challenge to the construction industry both now and in upcoming decades, raising production costs. Therefore, there is a need in the art for improved drainage ditch laying in order to reduce costs and increase efficiency. The present invention addresses this need.

SUMMARY OF THE INVENTION

In order to improve the efficiency, reduce cost and alleviate the labor-intensive nature of conventional ditch laying, the present invention provides an apparatus to forms concrete-based drainage ditches automatically. The apparatus is capable of continuously laying and finishing ditches in-situ without the need for manual intervention of workers. A worker need only pour mixed concrete into the apparatus which lays and molds the concrete in a pre-dug channel. Advantageously, the apparatus has a robust, uncomplicated design that can be easily fabricated, maintained, and repaired.

In one aspect, the present invention provides an apparatus for automatically extruding and forming a finished concrete channel in a drainage ditch. The apparatus includes a frame having support rails for positioning the apparatus over a drainage ditch. A concrete-receiving hopper is attached to the frame for delivering received concrete into the ditch to be shaped into a channel form. A mold having a projection to define a concrete surface of the channel is positioned beneath a top portion of the frame and configured to be received in a hollow mating portion of a laterally-reciprocating piston to shape the received concrete. A lever driver drives the reciprocating piston through a mechanically-linked motor. A vibrator cooperates with the concrete-receiving hopper to urge received concrete into the ditch to be shaped by the mold.

In a further aspect the lever driver includes one or more motor pulleys and flywheels to increase force for driving the reciprocating piston.

In a further aspect, the vibrator includes a waterproof membrane for contacting and urging the received concrete and a vibrating frame to which the waterproof membrane is attached.

In a further aspect, supporting ribs are positioned between the mold and the piston, the supporting ribs being sized to provide a gap for sand and aggregates in the received concrete.

In a further aspect, at least one adjustable support is connected on each side of the frame, and is independently actuable to raise or lower a height of the frame with respect to ground surrounding the ditch.

In a further aspect, each of the adjustable supports includes a rotatable wheel and a spring attached to the rotatable wheel in which a degree of compression of the spring determines a height of an individual adjustable support.

In a further aspect, the rotatable wheel of each adjustable support includes a projection that is received in one of the support rails of the frame.

In a further aspect, the apparatus is self-propelling under action of the piston against molded concrete which moves the apparatus along the ditch.

BRIEF DESCRIPTION OF THE DRAWINGS

Aspects of the present disclosure are readily understood from the following detailed description when read with the accompanying figures. It should be noted that various features may not be drawn to scale. In fact, the dimensions of the various features may be arbitrarily increased or reduced for clarity of discussion.

Embodiments of the invention are described in more detail hereinafter with reference to the drawings, in which.

DETAILED DESCRIPTION

Figure 1A:
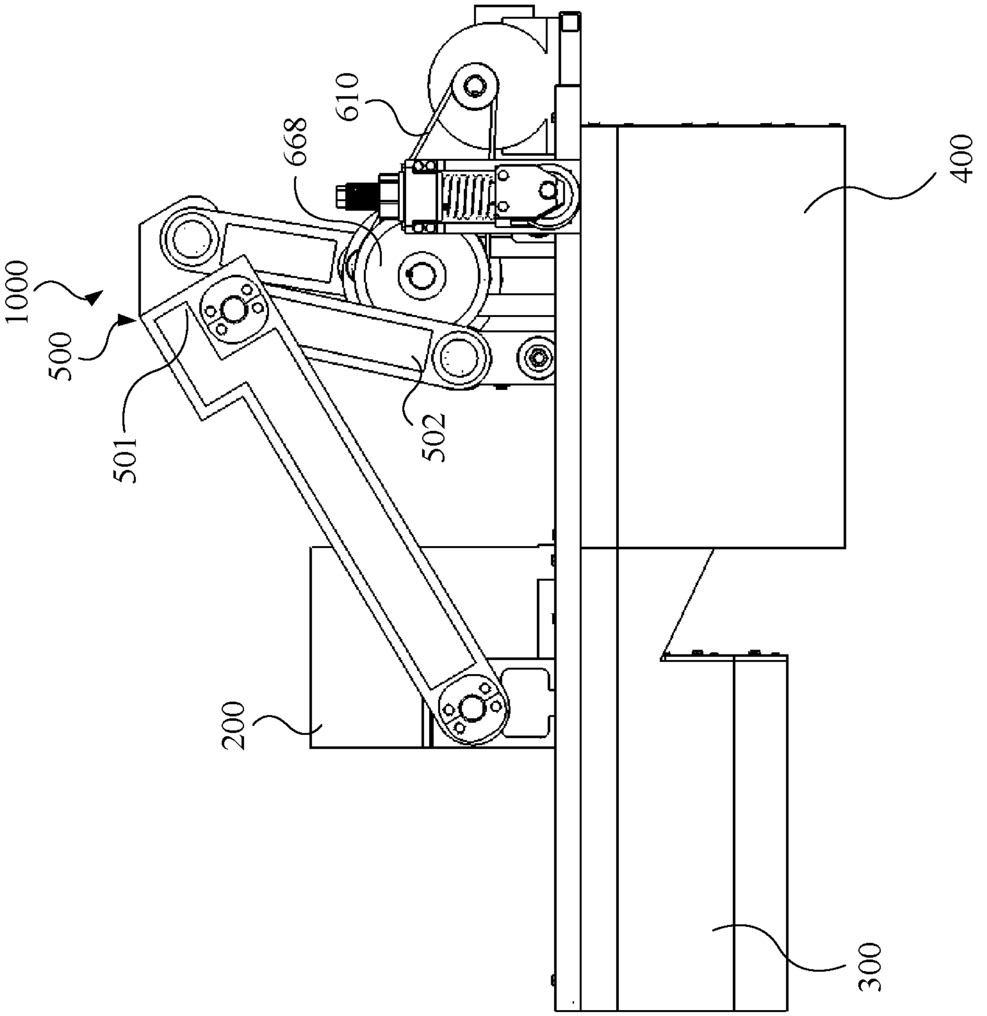
FIGS. 1A and 1B side and perspective views of an apparatus for forming a concrete channel.

Common reference numerals are used throughout the drawings and the detailed description to indicate the same or similar components. Embodiments of the present disclosure will be readily understood from the following detailed description taken in conjunction with the accompanying drawings.

Spatial descriptions, such as "above," "below," "up," "left," "right," "down," "top," "bottom," "vertical," "horizontal," "side," "higher," "lower," "upper," "over," "under," and so forth, are specified with respect to a certain component or group of components, or a certain plane of a component or group of components, for the orientation of the component(s) as shown in the associated figure. It should be understood that the spatial descriptions used herein are for purposes of illustration only, and that practical implementations of the structures described herein can be spatially arranged in any orientation or manner, provided that the merits of embodiments of this disclosure are not deviated from by such arrangement.

Figure 1B:
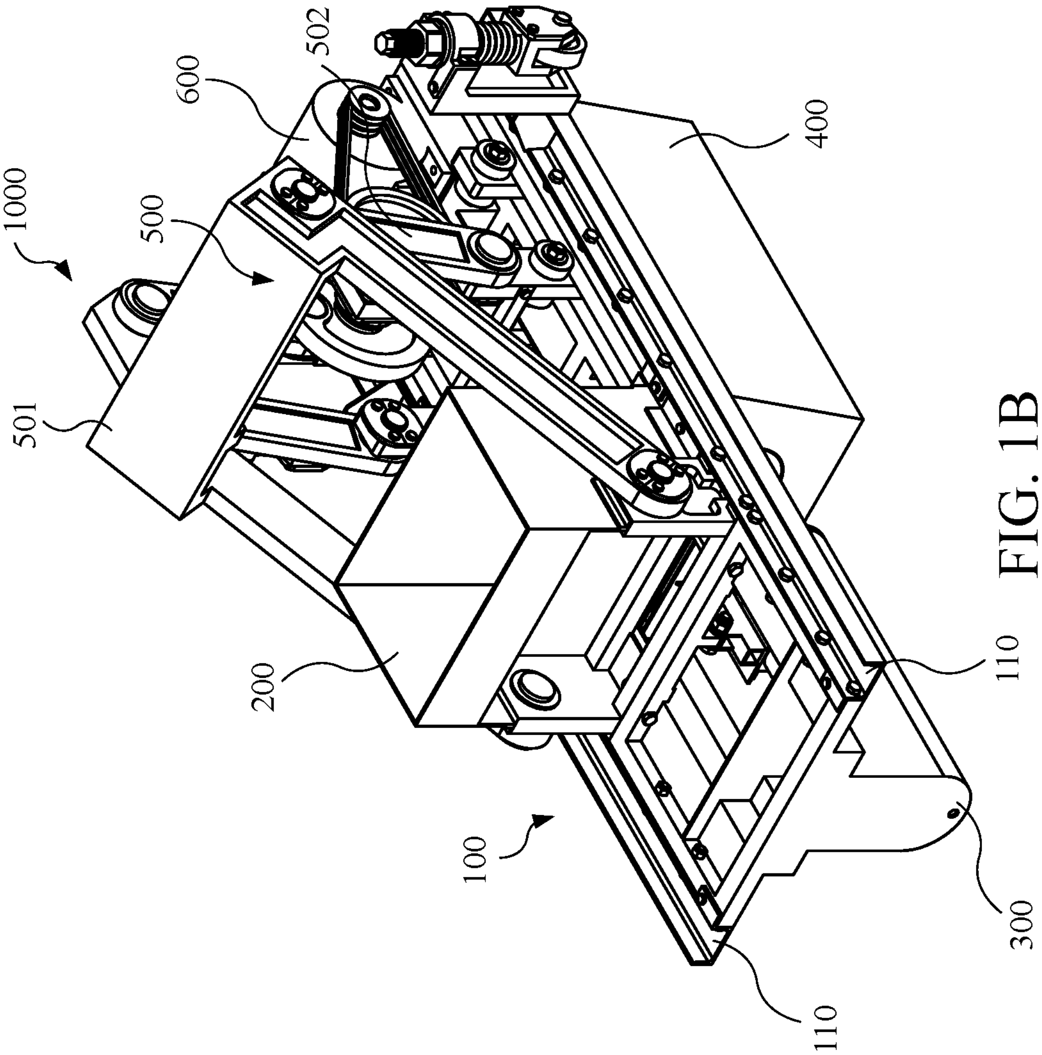

FIGS. 1A and 1B which are side and perspective views providing an overview of apparatus 1000 for automatically extruding and forming a finished concrete channel according to some embodiments of the present disclosure. The apparatus 1000 includes frame 100 including support rails 110 for positioning the apparatus 1000 over a ditch. A concrete-receiving hopper 200 is attached to the frame 100 for delivering received concrete into the ditch to be shaped into a channel form. A mold 300 having a projection to define a concrete surface of the channel is positioned beneath a top portion of the frame 100 and configured to be received in a hollow mating portion of a laterally-reciprocating piston 400 to shape the received concrete A lever system 500 includes lever 502 and lever driver 501 for driving the reciprocating piston 400 via a mechanically-linked motor 600. In one aspect, pulley 668 connect motor 600 to lever driver 502.

Figure 2:
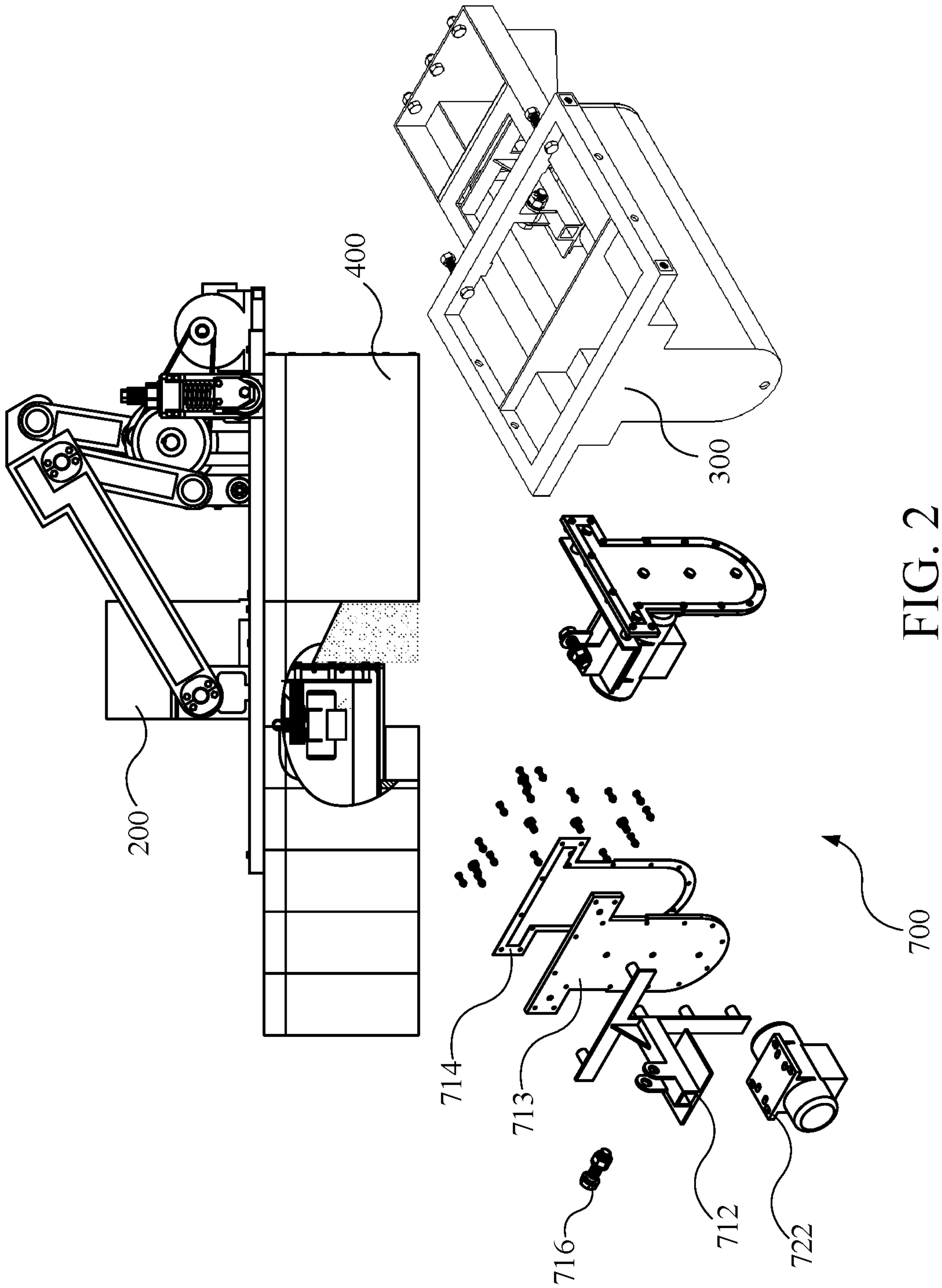
FIG. 2 is a detailed view with parts separated of a vibration system for the apparatus of FIG. 1.

Details of each of these component systems are shown in the detailed system views of FIGS. 2-8, below. FIG. 2 depicts a detailed view of a vibration system 700 for urging the concrete received via hopper 200 into the prepared ditch in order to be formed by the mold and piston. In FIG. 2, vibration system 700 includes a vibrator 722 installed on moving vibration frame 712 through pin 716. Vibration rubber membrane 713 is mounted between vibration frame 712 and metal plate 714 with screws or other fasteners. The vibration rubber membrane 713 contacts the received concrete from the hopper 200. The rubber membrane 713 may be waterproof due to its need to contact the wet concrete. Vibrator 722 provides indirect vibration to the received concrete via membrane 713. The concrete is compacted through the mold 300 via the force of the reciprocating piston body assembly 400.

Note that the fluidity of the concrete mix used to create the channel is relatively low since a stiffer, drier concrete is needed for compaction and to hold the shape of the mold without slumping under its own weight. Therefore, the vibration system 700 system improves the fluidity and facilitate the motion of concrete mix from the hopper into the mold located at the front of apparatus 1000. The vibrator 722 drives the vibration of membrane 713 through vibration frame 712. The Thus, the vibration of membrane makes the vibration of the concrete mix and favors its motion. Through the design, this vibration system 700 has a high energy efficiency, producing a large vibration amplitude with a small force. Therefore, a smaller motor may be used instead of a large one, which minimizes the size of the machine and reduces its cost and operating costs.

Figure 3:
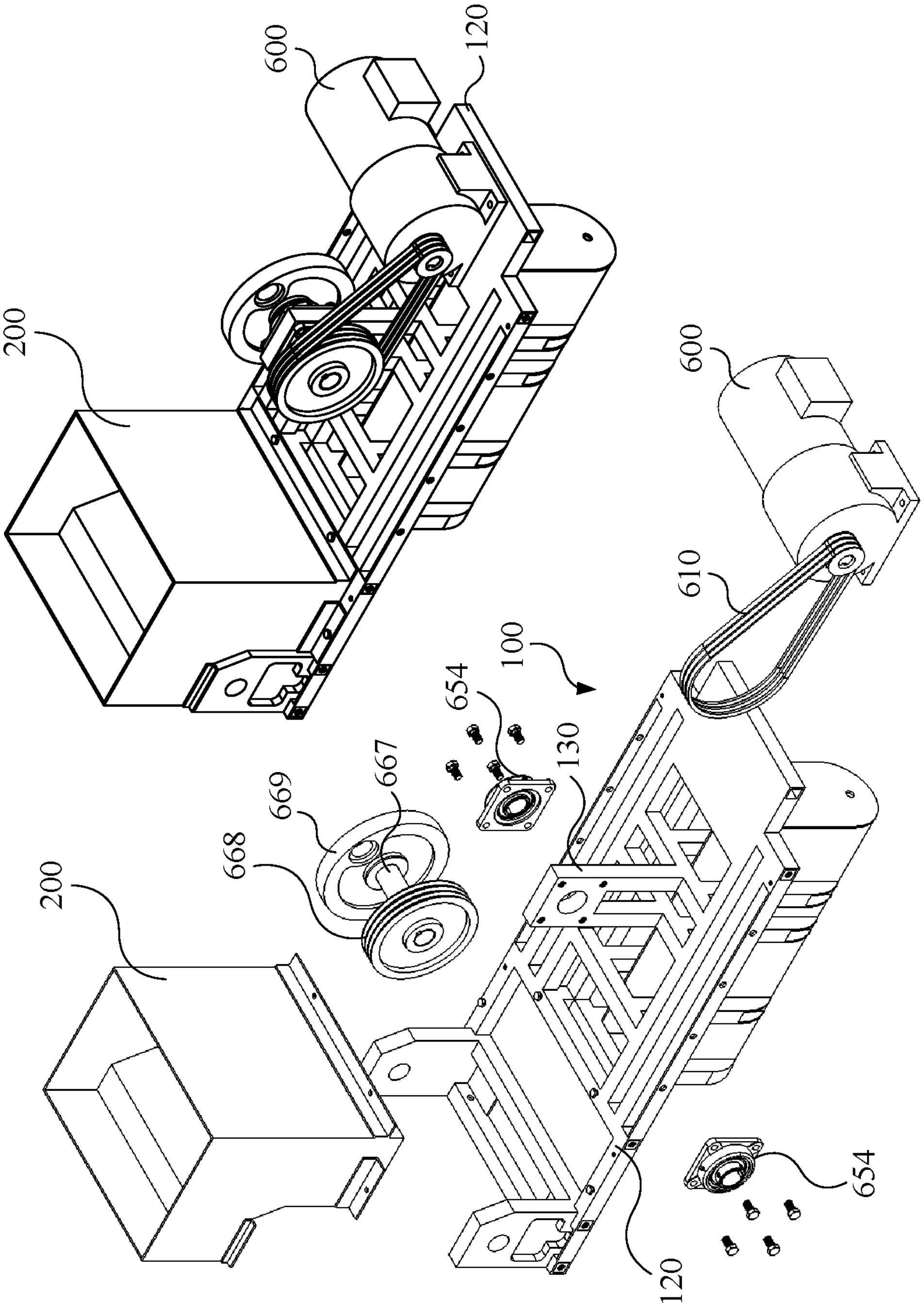
FIG. 3 is a detailed view with parts separated for the apparatus of FIG. 1.

FIG. 3 depicts the relationship between various subassemblies and the apparatus frame 100 (depicted without rails 110). Frame 100 includes a frame body 120 for mounting concrete-receiving hopper 200 which is mounted onto the frame body 120 with screws, bolts, or other fasteners. Motor 600 is installed at the end of frame body 120, which provides rotary power that is delivered by belt 610 to flywheel 668 which drives drive shaft 667. Shaft 667 is joined with two bearings 654 for mounting on projection 130 of frame body 120 and secured with set screws. The rotation of drive shaft 667 in turn rotates wheel 669 which is connected to the lever driving system, discussed in further detail below.

Figure 4:
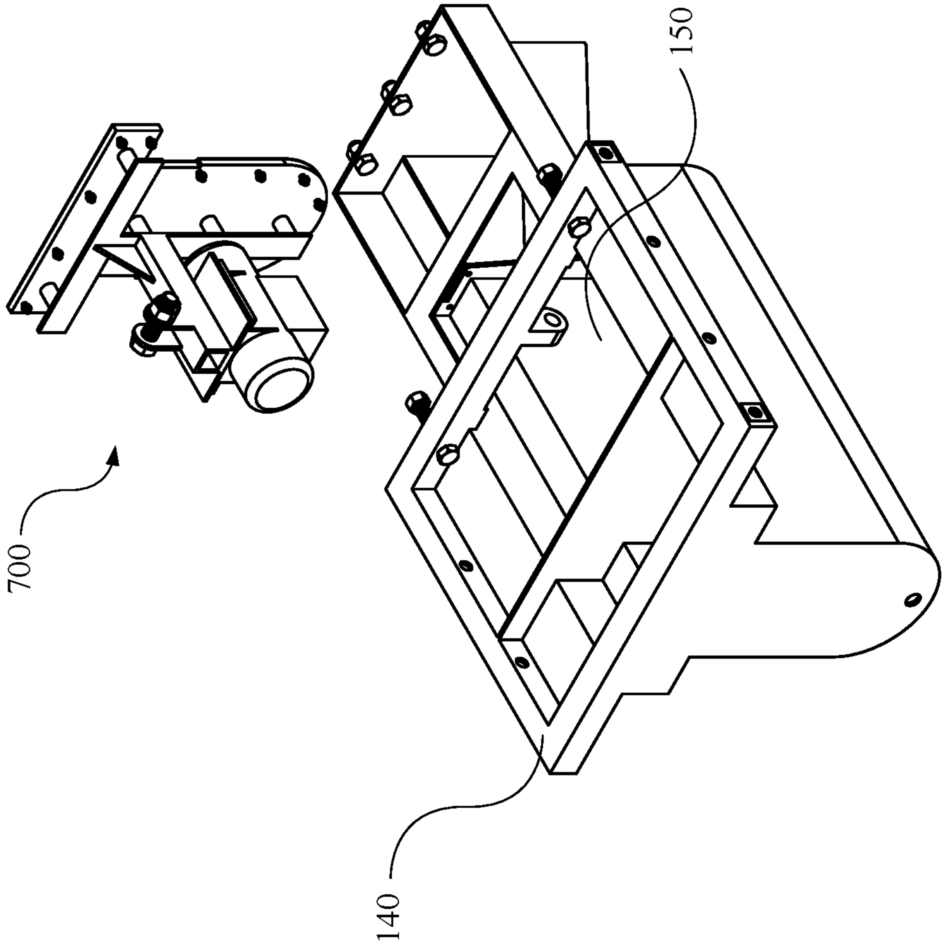
FIG. 4 is a detailed view with parts separated of a frame rear portion and mold for the apparatus of FIG. 1.

FIG. 4 depicts the connection of sub-assemblies to a front frame 140. The vibration sub-assembly 700 is beneath the upper front frame portion 140. Mold 300, which may be integrally-formed with front frame portion 140, also extends beneath front frame portion 140. When mold 300 is configured as a separable element from frame 140, different molds having different shapes may be selected. As seen in FIG. 3, a hollow section 150 is formed for receiving concrete from hopper 200.

Figure 5A:
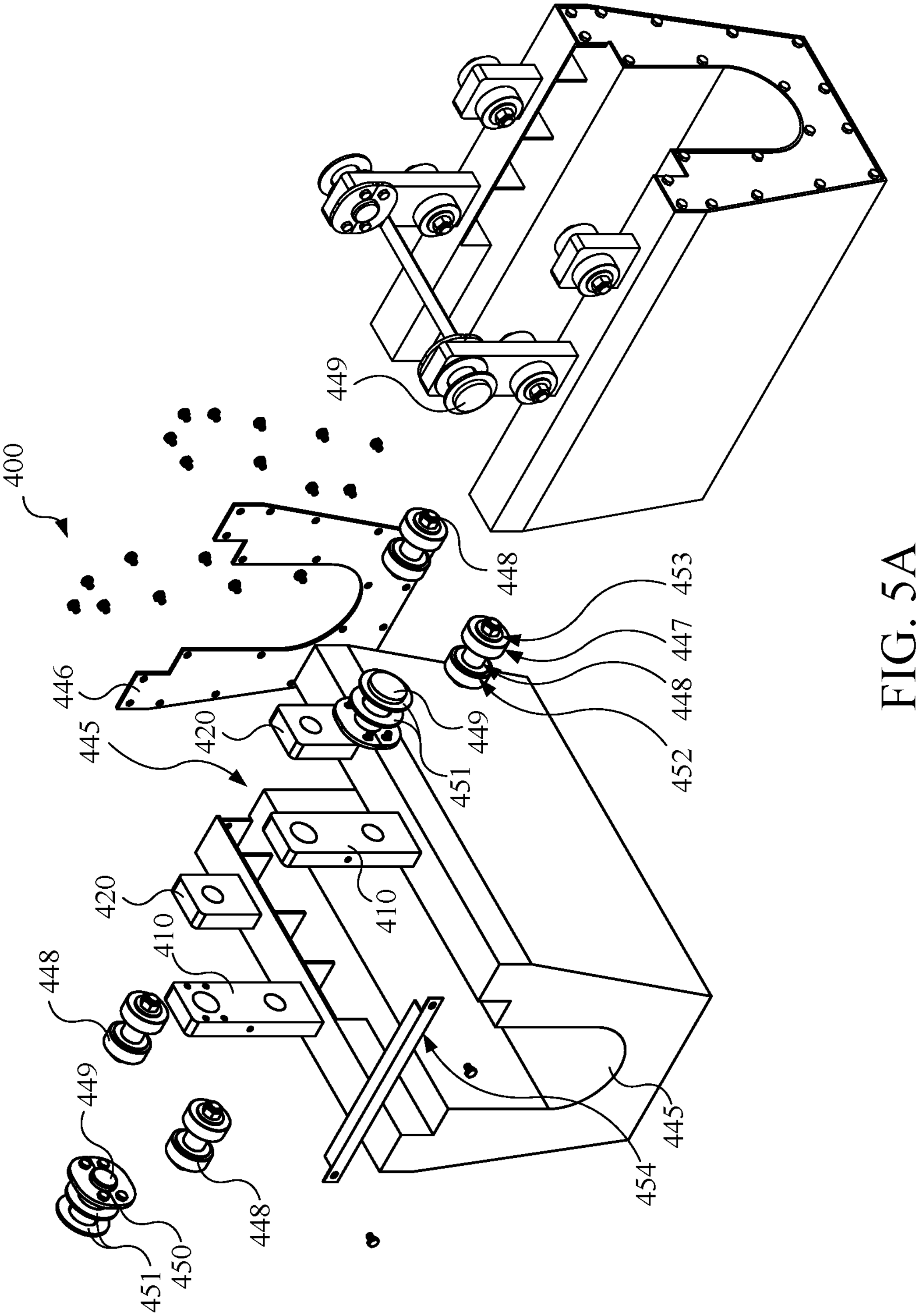
FIG. 5A is a detailed view with parts separated of a piston for the apparatus of FIG. 1.

FIG. 5A depicts details of the piston sub-assembly, 700. As seen in FIG. 5, a cover 446 is installed on an opening 445 of piston body 400 and secured with set screws. An angle iron 454 is fixed on piston body 400 and tightened by two screws to reduce deformation of the piston body assembly.

The piston body 400 includes four projections, two projections 410 with two apertures and two projections 420 with one aperture. Four pin joints 448 mount to the lower aperture of projection 410 and to the apertures in projection 420 and are fixed with two ball bearing 447 located axially at one end of shaft 448. Flat washers 452 and 453 are used for supporting side to side motion on the shaft joints 448 and secured with set screws. A total of eight ball bearings 447 provide smooth relative movement between the piston body assembly and a rear portion of the frame.

Two pin joints 449 are located on the upper aperture of projection 410 using flat washers 451 for supporting side to side motion on the shaft joint 449. The shaft joints 449 are engaged in the projection 410 apertures by lever rings 450 and secured with set screws. The two shaft joints 449 are also connected through an aperture in a lever 577 (discussed below in connection with FIG. 6) for driving the reciprocating motion of the piston body assembly.

Figure 5B:
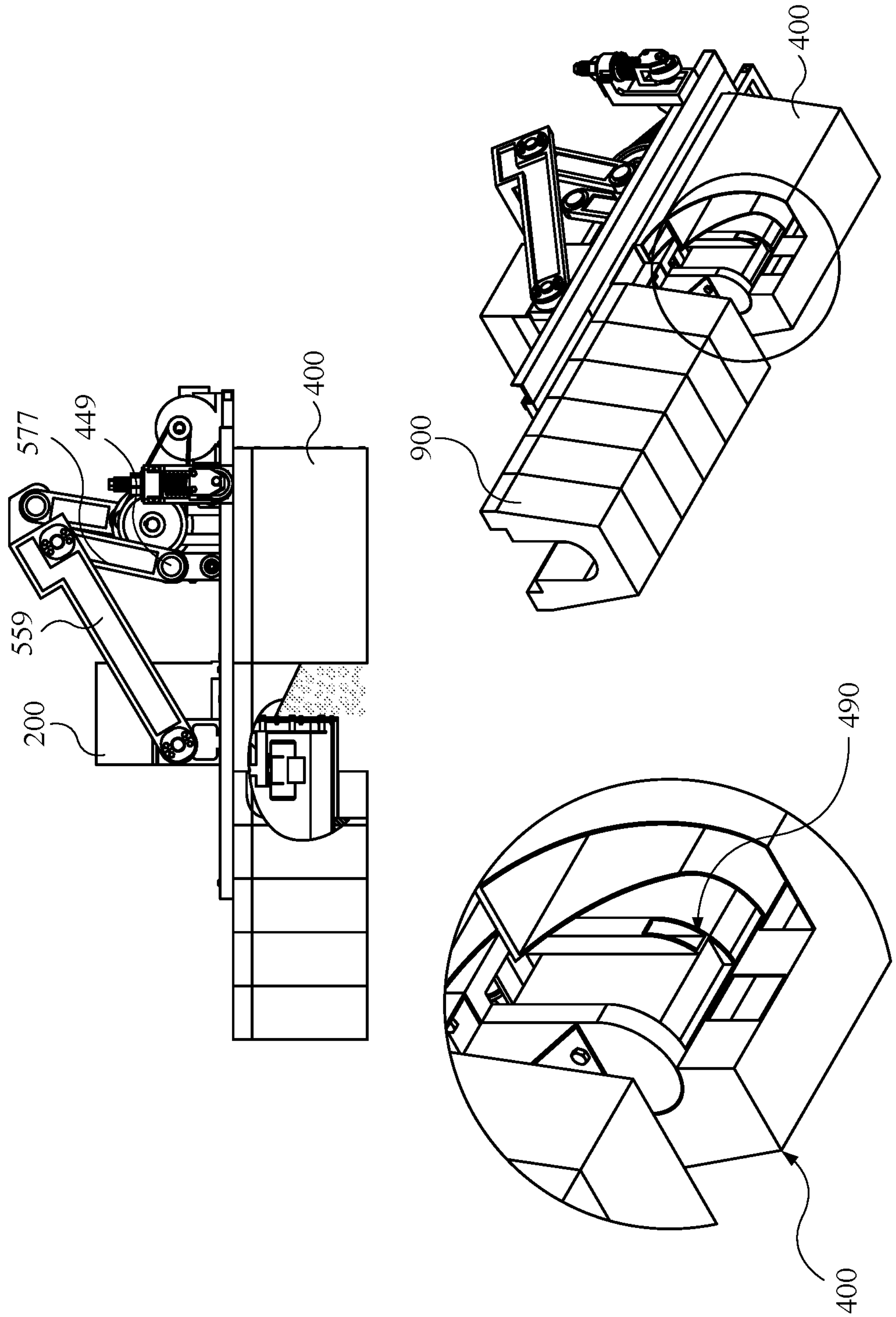
FIG. 5B is a detailed view with parts separated of a rib structure for a piston for the apparatus of FIG. 1.

Due to the reciprocating motion of the piston body 400, and close tolerances of mating parts, occasionally, the piston may be jammed by the relatively dry concrete mixture, which leads to a sudden stoppage of apparatus 1000 to remove the jammed concrete. In order to avoid such concrete jams, supporting ribs 490 are used between the mold 300 and piston 400, as seen in FIG. 5B. The supporting ribs 490 reduce the contact area, providing a gap for sands and aggregates in the concrete mixture to pass and reduce friction while still giving sufficient supporting strength to piston 400. The number and size of supporting ribs 490 can be adjusted according to a selected shape of the mold and piston (which may be varied depending upon a desired depth and surface contour of the concrete channel). The presence of supporting ribs 490 assists in assembly and cleaning of apparatus 1000, reducing maintenance time and effort as well as allowing for easy changing of piston and molds for different construction needs.

Figure 6:
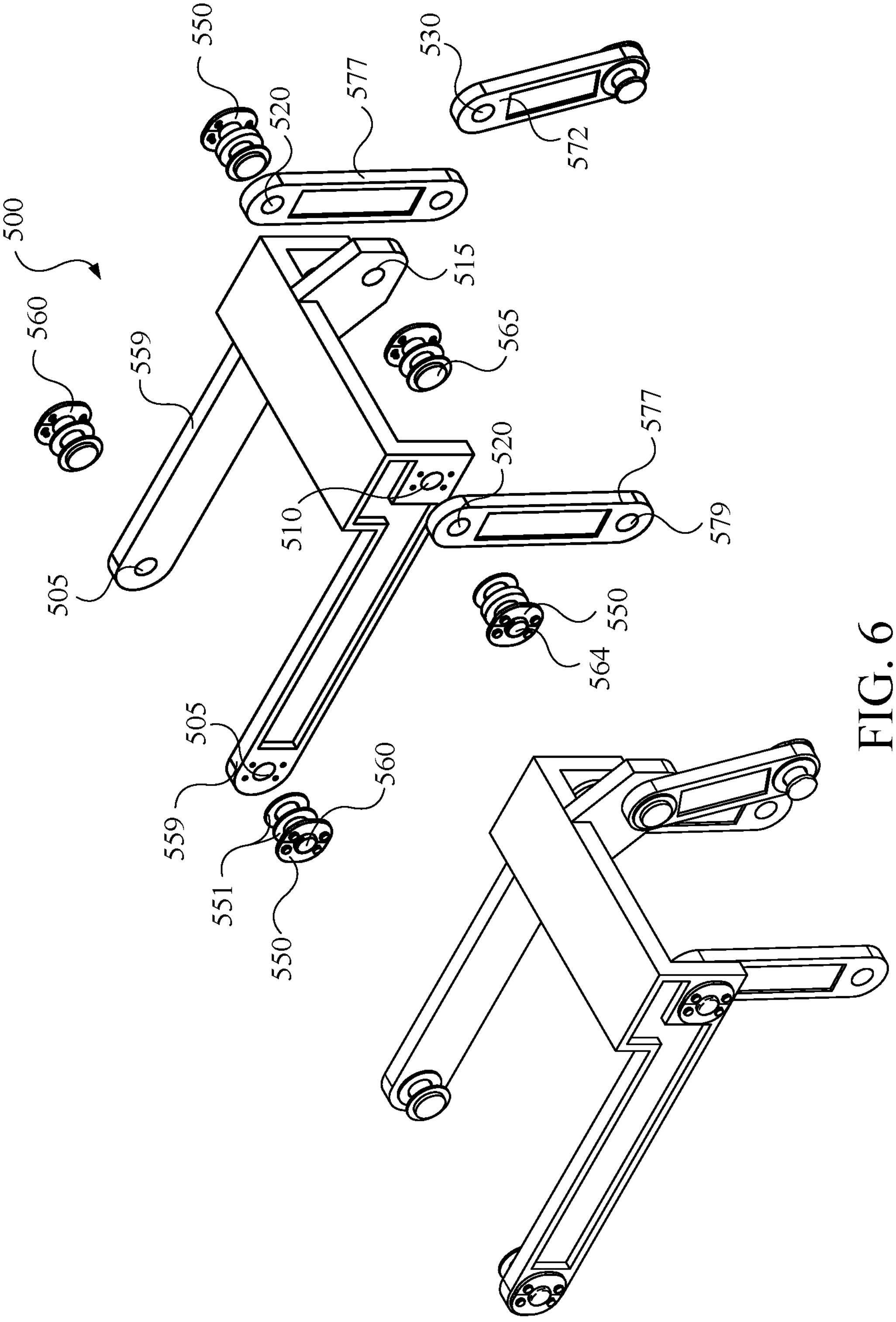
FIG. 6 is a detailed view with parts separated of a lever system for the apparatus of FIG. 1.

FIG. 6 shows the various components and attachments for a lever sub-assembly 500 that provides reciprocal motion of the piston assembly. The lever assembly includes the main levers 559 along with smaller linking levers 577 that connect to the main levers 559 through shaft joints 550. Two front lever pins 560 are joined together through the front apertures 505 of main lever 559 with two flat washers 551. Front lever pins 560 are engaged in the main lever 559 by lever rings and secured via set screws. The two front lever pins 560 are additionally connected to lever mounting holes in the rear portion of the frame (not seen in this view). Aperture 579 in lever 577 will connect to the frame via pins 449 as seen in FIG. 5B.

Two middle lever pins 564 are joined onto apertures 510 in the main levers 559 using two middle holes with flat washer 551 and washer 563. The two smaller linking levers 577 are connected into middle lever pin 564 which is locked by lever rings 550 and secured with set screws. In this manner, the linking levers 577 are linked to the main levers 559.

A rear lever pin 565 is joined onto main lever 559 through a rear aperture 515 with two flat washers 551. A motor lever 572 is connected into rear lever pin 565, which is locked by lever rings 550 and secured via set screws. The aperture hole 530 of motor lever 572 is connected to a flywheel assembly (FIG. 3) for rotational movement. The flywheel assembly drives the lever assembly up and down to produce the reciprocating motion of piston body assembly.

Figure 7:
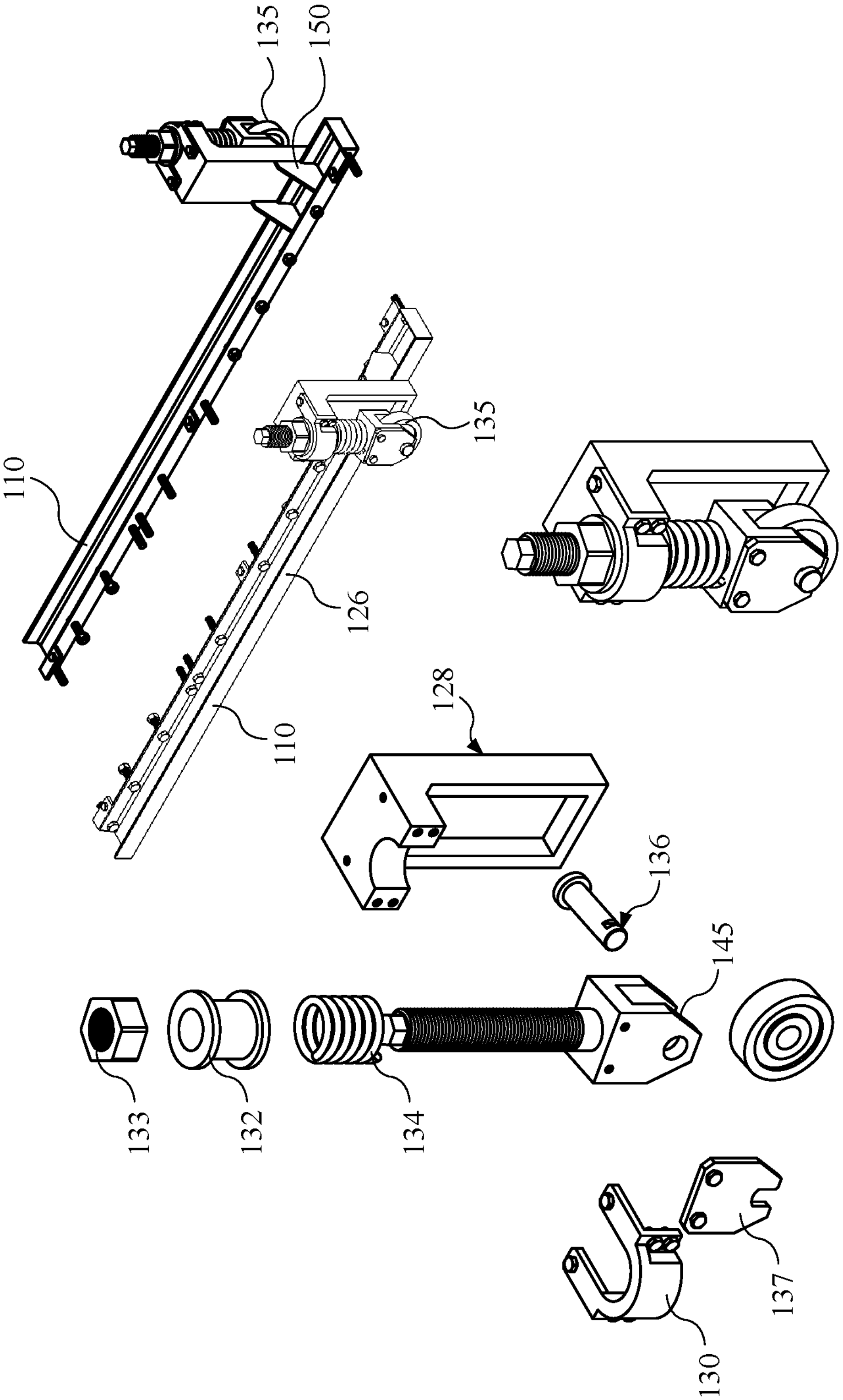
FIG. 7 is a detailed view with parts separated of a rail system and height-adjustable wheels for the apparatus of FIG. 1.

FIG. 7 depicts the supporting rail structure of the frame in detail along with height adjusters. Symmetric left side support rail 110 and right side rail 110 are installed on the frame rear portion and the frame front portion (shown in FIGS. 3 and 4) and secured with set screws. Rotatable body wheels 135 are positioned adjacent to the support rails and include height adjusters such that the height of apparatus 1000 may be selected.

The rotatable body wheels 135 are located within an opening of wheel frame 145 and fixed with wheel pin 136 which is inserted into an aperture in wheel frame 145. Wheel pin 136 is locked by wheel pin mount 137 and secured with two screws for rotational movement. A wheel spring 134 and movable supporting sleeve 132 are inserted along a rod 129 extending from an upper surface of wheel frame 145 and secured with a hex head bolt screw 133, which permits the adjustment of wheel frame 145 to be held in a selectable position relative to the ground.

A sleeve 132 is mounted on the opening of wheel side mount 128. Its position is locked by a wheel U-holder 130 and secured with set screws. A wheel side mount 128 is secured to left side frame 126 by welding or other fastening techniques. The wheel side mount 128 includes side projections 150 that are slidably engaged within the frame support rails on either side. Based on the design of U-shaped mounting device and the spring in the wheels, the height of the apparatus can be adjusted to reduce the influence of the uneven of the ground by turning screws to independently raise the height on either side to ensure that the apparatus 1000 is level.

Figure 8:
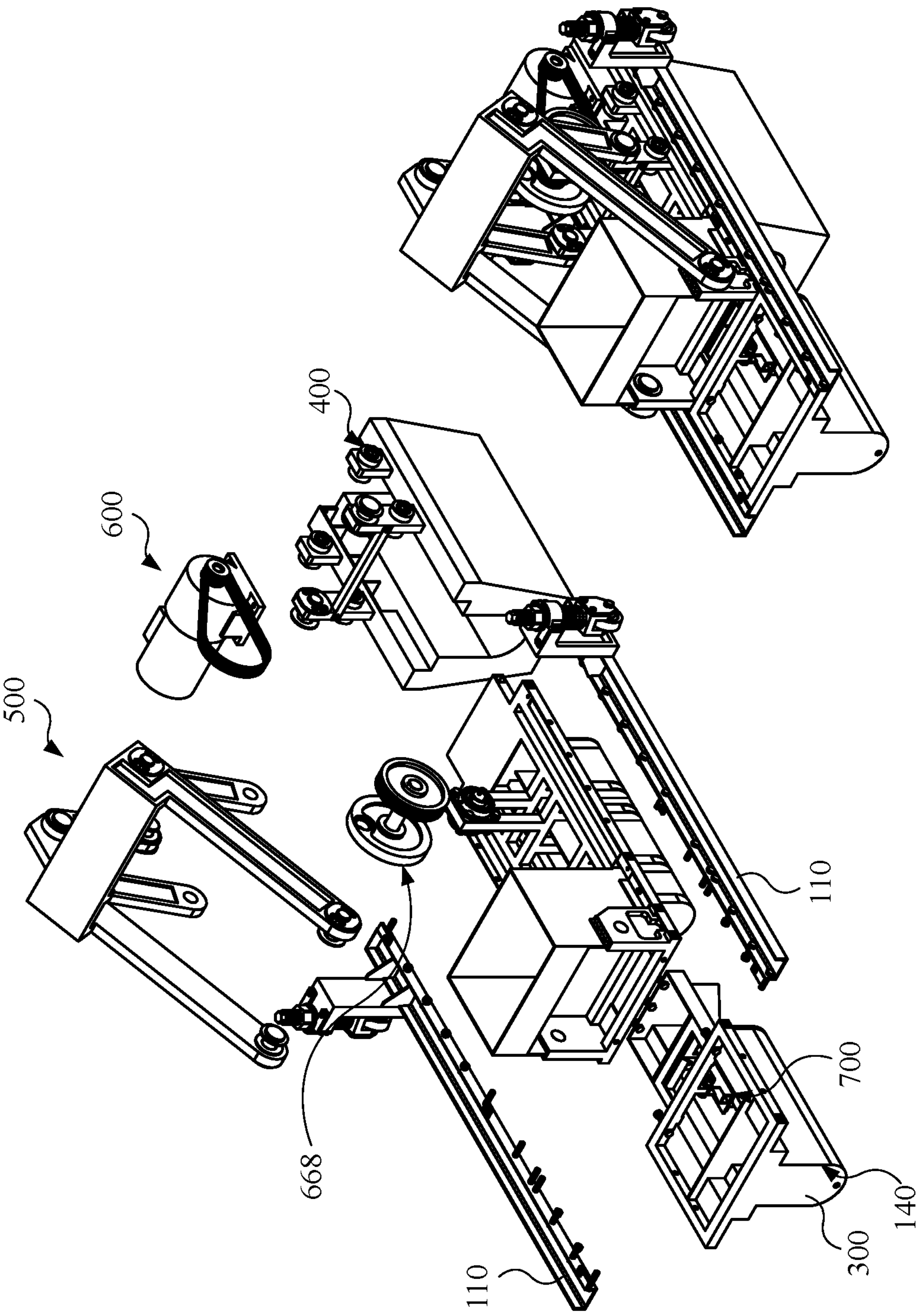
FIG. 8 depicts assembly of various sub-systems to form the apparatus of FIG. 1.

FIG. 8 depicts the integration of the sub-assemblies to form apparatus 1000. In FIG. 8, vibration sub-assembly 700 is installed into the front frame portion 140 and secured with fasteners. The piston body assembly 400 is secured to frame portion 100. Left and right side rails 110 are secured to front frame portion 140 and rear frame portion 100 using fasteners. The motor assembly 600 with flywheel 668 are then secured to frame 100 and belt 610 connected between the motor 600 and flywheel 668. The lever system 500 is connected to flywheel 668 and to the frame 100 as well as piston assembly 400.

Figure 9:
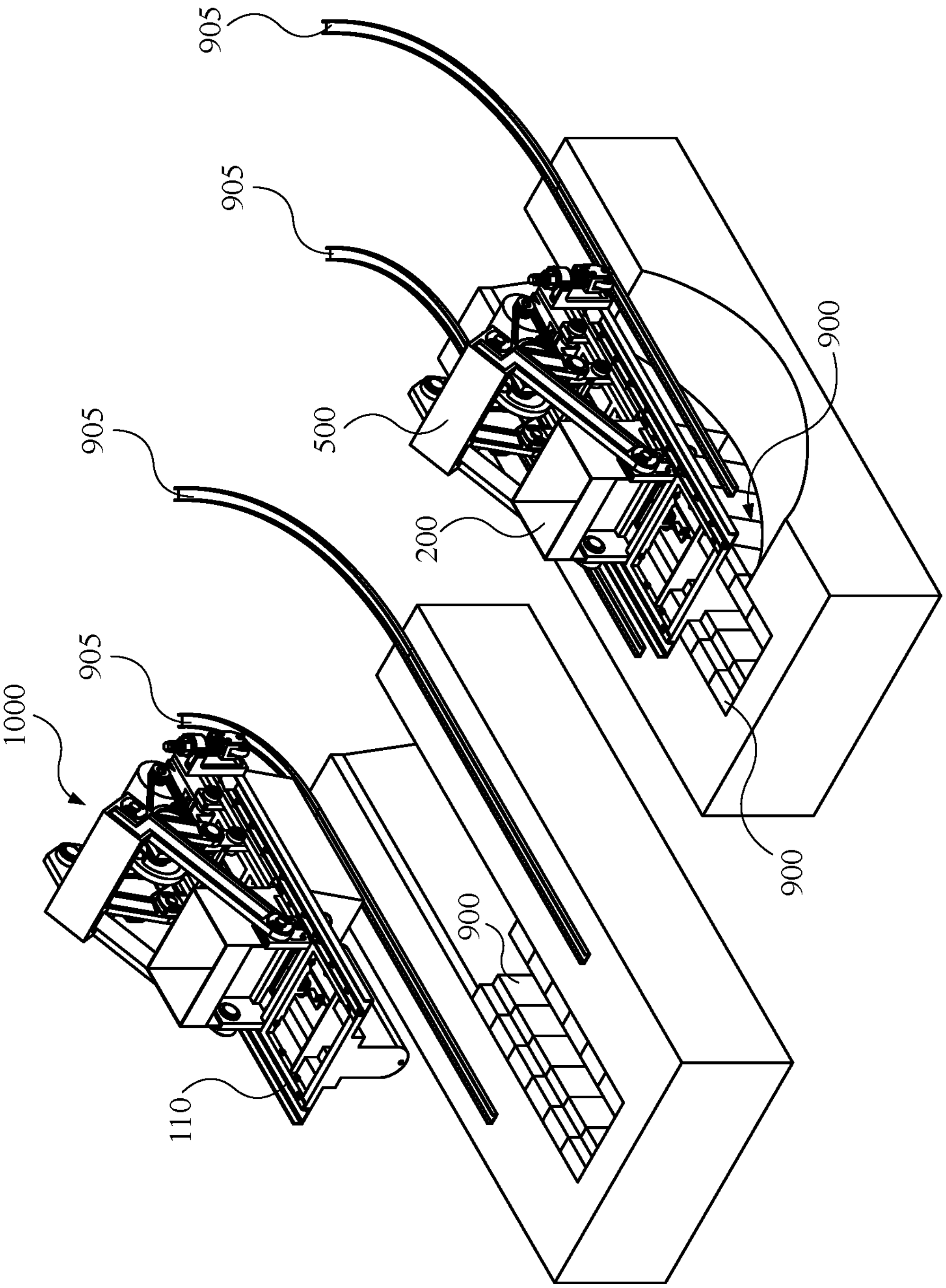
FIG. 9 depicts operation of the apparatus of FIG. 1.

FIG. 9 depicts the operation of the assembled apparatus 1000 and the formation of the concrete channel within a ditch. A ditch is formed in soil where a concrete channel for diverting water is desired, for example, adjacent to a roadway. The apparatus 1000 is centered above the ditch using support rails 110. Each wheel assembly is independently height adjusted such that apparatus 1000 is level with respect to the channel to be formed. The wheels may slide along guide rails 905 for a smooth path on either side of the ditch. Concrete from an external source such as a concrete-carrying truck on a local on-site mixer is guided into the concrete hopper 200. The concrete mix enters the hopper 200 and is urged into the ditch through the action of the vibrating membrane. The reciprocating piston forms the U-shaped channel against the mold 300. The concrete mix is compacted in the mold and extruded as seen by formed concrete channel sections 900 under the force of a reciprocating piston. The reciprocating piston is driven by motor 900 through lever assembly using a reduction gearing system. The force of the reciprocating piston against the concrete mix drives the entire apparatus 1000 forward as a whole by a preset amount, thus continuously forming the concrete channel without manual repositioning.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

As used herein and not otherwise defined, the terms "substantially," "substantial," "approximately" and "about" are used to describe and account for small variations. When used in conjunction with an event or circumstance, the terms can encompass instances in which the event or circumstance occurs precisely as well as instances in which the event or circumstance occurs to a close approximation. For example, when used in conjunction with a numerical value, the terms can encompass a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

As used herein, the singular terms "a," "an," and "the" may include plural referents unless the context clearly dictates otherwise. In the description of some embodiments, a component provided "on" or "over" another component can encompass cases where the former component is directly on (e.g., in physical contact with) the latter component, as well as cases where one or more intervening components are located between the former component and the latter component.

While the present disclosure has been described and illustrated with reference to specific embodiments thereof, these descriptions and illustrations are not limiting. It should be understood by those skilled in the art that various changes may be made and equivalents may be substituted without departing from the true spirit and scope of the present disclosure as defined by the appended claims. The illustrations may not necessarily be drawn to scale. There may be distinctions between the artistic renditions in the present disclosure and the actual apparatus due to manufacturing processes and tolerances. There may be other embodiments of the present disclosure which are not specifically illustrated. The specification and the drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations.

The invention claimed is:

1. Apparatus for automatically extruding and forming a finished concrete channel, comprising:

a frame including support rails for positioning the apparatus over a ditch and wheels, wherein each of the wheels is independently height adjustable;

a concrete-receiving hopper attached to the frame for delivering received concrete into the ditch to be shaped into a channel form;

a mold having a projection to define a concrete surface of the channel positioned beneath a top portion of the frame and configured to be received in a hollow mating portion of a laterally-reciprocating piston to shape the received concrete;

a lever system for driving the reciprocating piston through a mechanically-linked motor, wherein the lever system comprises a flywheel, a belt connected between the flywheel and the motor to drive the flywheel by the belt, one or more main levers, and one or more secondary levers;

wherein the one or more secondary levers are connected to the one or more main levers;

wherein the flywheel is connected to a lever-driving wheel;

and wherein the lever system further comprises a motor lever connected to the lever-driving wheel such that the flywheel drives the motor lever in a reciprocating vertical motion to cause the lever system to move up and down and produce a corresponding reciprocating motion of the reciprocating piston for propelling the apparatus;

a vibrator cooperating with the concrete-receiving hopper to urge the received concrete into the ditch to be shaped by the mold; and guide rails for sliding the wheels, wherein the guide rails are positioned on surfaces of grounds adjacent and above the ditch;

wherein the frame, the concrete-receiving hopper, and the lever system are positioned on top of a level of the grounds adjacent and above the ditch; and wherein the apparatus is propelled by the reciprocating motion of the reciprocating piston against the molded concrete, which moves the apparatus along the ditch for forming a continuous extruded channel.

2. The apparatus for automatically extruding and forming a finished concrete channel according to claim 1, wherein the vibrator includes a waterproof membrane for contacting and urging the received concrete and a vibrating frame to which the waterproof membrane is attached.

3. The apparatus for automatically extruding and forming a finished concrete channel according to claim 1, further comprising supporting ribs positioned between the mold and the piston, the supporting ribs being sized to provide a gap for sand and aggregates in the received concrete.

4. The apparatus for automatically extruding and forming a finished concrete channel according to claim 1, further comprising at least one adjustable support connected on each side of the frame, each of the adjustable supports being independently actuated to raise or lower a height of the frame with respect to ground surrounding the ditch.

5. The apparatus for automatically extruding and forming a finished concrete channel according to claim 4, wherein each of the at least one adjustable supports includes the wheel and a spring attached to the rotatable wheel in which a degree of compression of the spring determines a height of an individual adjustable support.

6. The apparatus for automatically extruding and forming a finished concrete channel according to claim 5, wherein the wheel includes a projection that is received in one of the support rails of the frame.

* * * * *